US012607246B2

(12) United States Patent
Mitsch

(10) Patent No.: US 12,607,246 B2
(45) Date of Patent: Apr. 21, 2026

(54) TEMPERATURE-ADAPTIVE EDDY CURRENT ROTATION DAMPER

(71) Applicant: FM Energie GmbH & Co.KG, Heppenheim (DE)

(72) Inventor: Franz Mitsch, Heppenheim (DE)

(73) Assignee: FM Energie GmbH & Co.KG, Heppenheim (DE)

( * ) Notice: Subject to any disclaimer, the term of this patent is extended or adjusted under 35 U.S.C. 154(b) by 438 days.

(21) Appl. No.: 18/553,274

(22) PCT Filed: Mar. 28, 2022

(86) PCT No.: PCT/EP2022/025123
§ 371 (c)(1),
(2) Date: Sep. 29, 2023

(87) PCT Pub. No.: WO2022/207146
PCT Pub. Date: Oct. 6, 2022

(65) Prior Publication Data
US 2024/0183424 A1 Jun. 6, 2024

(30) Foreign Application Priority Data
Mar. 31, 2021 (EP) ..................................... 21020171

(51) Int. Cl.
*F16F 15/03* (2006.01)

(52) U.S. Cl.
CPC ...... *F16F 15/035* (2013.01); *F16F 2222/025* (2013.01); *F16F 2230/0052* (2013.01); *F16F 2232/04* (2013.01)

(58) Field of Classification Search
CPC ...... F16F 7/10; F16F 15/035; F16F 2222/025; F16F 2230/0052; F16F 2232/04; F16F 2222/02; F05B 2260/964; F03D 13/20; Y02E 10/72
See application file for complete search history.

(56) References Cited

U.S. PATENT DOCUMENTS

| | | | | |
|---|---|---|---|---|
| 10,711,859 | B2* | 7/2020 | Mitsch | F16F 7/1022 |
| 11,255,409 | B2* | 2/2022 | Mitsch | F16F 7/10 |
| 2018/0252287 | A1* | 9/2018 | Mitsch | E04H 9/0215 |

(Continued)

FOREIGN PATENT DOCUMENTS

| | | |
|---|---|---|
| EP | 2696072 B1 | 3/2015 |
| EP | 2746483 B1 | 11/2015 |
| WO | WO2016023628 A1 | 2/2016 |

(Continued)

OTHER PUBLICATIONS

International Search Report Corresponding to PCT/EP2022/025123 mailed Sep. 6, 2022.

(Continued)

*Primary Examiner* — Thomas W Irvin
(74) *Attorney, Agent, or Firm* — Finch & Maloney PLLC

(57) ABSTRACT
The invention relates to an oscillation damper which is in particular suitable for wind turbines and which is based on the eddy current principle and is temperature-controlled in such a way that it can not only effectively dissipate the heat generated by the eddy current but can also effectively and self-adjustingly compensate for the damping loss occurring at higher temperatures.

16 Claims, 8 Drawing Sheets

(56) References Cited

U.S. PATENT DOCUMENTS

2020/0284240 A1* 9/2020 Mitsch .................... F03D 80/00
2021/0048088 A1* 2/2021 Mitsch .................... F16F 15/31

FOREIGN PATENT DOCUMENTS

WO    WO2017036581 A1    3/2017
WO    WO2019029839 A1    2/2019
WO    WO2019154557 A1    8/2019

OTHER PUBLICATIONS

Written Opinion Corresponding to PCT/EP2022/025123 mailed
Sep. 6, 2022.

* cited by examiner

A-A(2:3)

E(1,33:1)

B-B

TEMPERATURE-ADAPTIVE EDDY CURRENT ROTATION DAMPER

This application claims the benefit under 35 U.S.C. § 371 as a U.S. National Phase Application of application no. PCT/EP2022/025123, filed on 28 Mar. 2022, which claims benefit of European Patent Application no. 21020171.1 filed 31 Mar. 2021, the contents of which are hereby incorporated herein by reference in their entireties.

FIELD OF THE INVENTION

The invention relates to an oscillation damper, in particular suitable for wind turbines, which is based on the eddy current principle and is temperature-regulated in such a way that it can not only effectively dissipate the heat generated by the eddy current, but can also effectively compensate for the damping loss occurring at higher temperatures in a self-regulating manner.

The invention relates in particular to a rotary oscillation damper which, together with an absorber mass, is moved on a preferably curved running surface according to the disturbing oscillation forces.

BACKGROUND OF THE INVENTION

Tall and slim constructions and systems are subject to unique oscillation conditions, which must be addressed by technical measures to prevent damage and premature fatigue processes. This applies in particular to wind turbines which, due to their rapid technical development, have increasingly been used in more extreme terrains (e.g., offshore) and heights in recent years, and also have ever higher masts to take advantage of the better wind conditions there. Such wind turbines must withstand the forces that arise due to wind, waves, weather, and operation, which subject the turbines to different loads at different points and endanger the operation and safety thereof. It is therefore necessary to specifically and effectively dampen the oscillations occurring in these turbines using technical measures. This is done with oscillation dampers of different designs according to the various different fields of application and problems being addressed.

This also includes oscillation dampers known in the prior art which operate according to the eddy current principle. The functional principle of such dampers is based on the fact that a current is induced in an electrical conductor (conductor element) which is moved by a changing magnetic field (magnetic element/permanent magnets). This induced current, also called eddy current, also generates a magnetic field. The magnetic field acts against the first magnetic field and thus generates a resistance force. A circulating eddy current is induced in the conductor by an axial relative movement between the conductor and the magnetic field. These resulting eddy currents in turn form magnetic fields which counteract the original magnetic field and brake the movement of the conductor. If the speed increases, the eddy current in the conductor increases, leading to a stronger magnetic field, such that the movement is further and more strongly braked.

EP 2 696 072 describes an oscillation damper arrangement for wind turbines having a mass pendulum. In the event of oscillation, the mass pendulum is preferably guided in two oscillation devices, wherein a movement occurs through a planar magnetic field, which generates the damping eddy current.

WO 2016/023628 describes an eddy current oscillation damper which can achieve higher damping densities and is moreover independent of the direction. The damper consists substantially of a cylindrical tube which has a magnet arrangement, and a conductor tube which is both guided in, and can move in, the interior thereof. Both tubes are guided in a friction-free manner in the magnet arrangement, wherein the conductor tube is guided relative to the magnetic cylinder tube in a preferred embodiment by a roller device outside the functional region.

WO 2017/036581 proposes an oscillation absorber developed in particular for wind turbines, which has a running gear/chassis, a main absorber mass and a curved running device, wherein the main absorber mass is attached to the chassis and is movable on the running device from a central position or apex position by means of wheels or rollers. In this case, the running gear/chassis and/or the main absorber mass has a disk-shaped, rotationally symmetric flywheel mass which makes up only a fraction of the main mass of the oscillation absorber and moves together with the main absorber mass. The rotational mass component can have an eddy current generating device which generates an additional damping.

WO 2019/154557 describes a similar oscillation damper in which the rotating flywheel mass is driven independently of the chassis by means of a novel belt device, and in addition to the rotating flywheel mass, a further damping device in the form of an eddy current damper is also provided.

WO 2019/029839 relates to an oscillation absorber for wind turbines which has an oscillating mass on a pendulum cable or a pendulum boom, wherein the mass has been made to oscillate by an excitation frequency and can then be damped, inter alia, by an eddy current rotation damper.

The general problem of the eddy current damping principle, in particular also in the above-described solutions of the prior art, is its temperature dependence. Due to the eddy current generated during the movement of the oscillation absorber, not only is a damping effect, which is proportional to the speed, generated by braking the movement of the absorber, but also considerable heat is generated by conversion of the kinetic energy. In the case of the eddy current dampers used in wind turbines, the heat output generated by the damping system can be between approximately 3 and 10 kW in the case of the eddy current dampers used in wind turbines. The heat is primarily produced in the conductor element of the eddy current device. However, since the conductivity of available eddy current conductors (aluminum, copper, etc.) decreases with increasing temperature, the eddy current power is also significantly reduced. Without measures for heat dissipation and temperature compensation, there would be a loss of efficiency of up to approximately 50% in the electrical conductor of the device at the resulting temperatures, which are far above 100° C. As such, the absorber function would not be ensured at high temperatures without other measures. An increase in the damping by larger conductor/magnet elements would have the disadvantage that the oscillation damper would possibly be damped too much at cold temperatures. Another possibility is to reduce the negative heating effect on the efficiency of the eddy current power with sufficient heat dissipation. As a rule, in the prior art, the conductor element is moved relative to a stationary magnet element for different reasons. As such, in the abovementioned patent applications, a rotationally symmetric conductor disk rotates around a stationary magnet disk, and the heat can only be dissipated to an inadequate extent by the heated, rotating plate—which necessarily always results in a loss of damping.

SUMMARY OF THE INVENTION

It was therefore an object of the present invention to provide an eddy current oscillation damper which has a high degree of efficiency over a large temperature range, and which also compensates for the heat produced during operation in a self-regulating manner, such that there are no significant losses in the damping effect of the absorber.

In addition to the temperature-adaptive properties, the object was also to create an oscillation damper in which the mass begins to move even just for small oscillation amplitudes, without experiencing a significant damping.

The stated object was achieved by the temperature-adaptive eddy current rotary oscillation damper described below and characterized in the claims.

The subject matter of the invention is therefore a temperature-adaptive eddy current rotary oscillation damper having the following features: (i) an absorber mass which is equipped with wheels or rollers mounted on at least one shaft, and which accordingly can be moved on a guide device, for example a running rail for rollers or wheels, according to the active oscillation forces, (ii) at least one rotationally symmetric magnetic disk, which is connected to the at least one shaft and rotates with it when the absorber mass moves, (iii) at least one stationary electrical conductor element, which is functionally connected to the at least one rotating magnetic disk via a gap, consequently generating an oscillation-damping eddy current during operation, (iv) the electrical conductor element is connected to the absorber mass, and its surface area and size are selected in such a manner that the absorber mass connected to it functions as a cooling body to dissipate heat generated by the eddy current, (v) having a displacement element able to axially move and displace the at least one magnetic disk on the at least one shaft in such a manner that it changes the width of the gap between the conductor element and the magnetic disk, and (vi) having a temperature-dependent expansion volume which acts on the displacement element by having an expansion coefficient which is greater than that of the displacement element, such that the displacement element (a) upon expansion of the volume by an increase in temperature, pulls the magnetic disk out of a starting position axially in the direction of the conductor plate, opposing a preload force and reducing the gap, and (b) when the volume contracts upon a drop in temperature, pushes the magnetic disk by the preload force back in the direction of the starting position, enlarging the gap.

The subject matter of the invention is further a corresponding oscillation damper which has an idle device which prevents the said magnetic disk from rotating together with the shaft and the rollers or wheels upon small movements or amplitudes of the absorber mass, thereby achieving lower damping as desired under these conditions.

Finally, the object of the invention is a wind turbine which is equipped with at least one oscillation damper according to the invention, for automatically damping oscillations occurring in the wind turbine, in a temperature-regulated manner.

The oscillation damper according to the invention is provided for use in tall, narrow structures and systems, in particular wind turbines.

For this purpose, the absorber mass with wheels or rollers on one or more shafts is placed on a guide device for these rollers or wheels, for example a rail arrangement. The mass can move in a predetermined plane or direction on this guide device. Preferably, the guide device or running rail arrangement is curved in a circular or concave manner, such that the mass can move back and forth in the predetermined direction in the manner of an oscillating pendulum upon oscillations in the system that are triggered by external forces. For example, the absorber mass can have four wheels or rollers on two axles or shafts. An oscillation damper according to the invention can be provided on each wheel or each roller via the given shaft. However, according to the invention, it is also sufficient to provide such an oscillation damper only on at least one wheel on a shaft.

The oscillation damper according to the invention is constructed as follows:

The electrical conductor consists of an electrically- and simultaneously thermally-conductive material, for example aluminum or copper or alloys of these metals. The electrical conductor is preferably provided as a plate which is not rotated according to the invention and is connected to the absorber mass. In this case, the size and extension of the plate are selected such that the best possible heat exchange with the absorber mass is made possible. The latter therefore serves as a cooling body. Preferably, large parts, or even all parts, of the surface of the absorber mass are covered with the electrical conductor material or are connected thereto via cooling ribs or heat pipes, for example. Due to the large surface area, the heat arising during operation can thus be dissipated over a large area via radiation and convection.

At the same time, this measure greatly increases the inertia in the heat dissipation, due to the large mass, such that even longer power peaks do not lead to excessive temperatures. In addition, the high inertia advantageously affects the control behavior, since the control elements used, which are described further below, also have a high inertia— which, however, is less than the inertia of the mass, such that the control loop is subject only to minimal hysteresis. This has the advantage that the path of the control elements, which according to the invention adapt the damping in a temperature-dependent manner, does not trail behind the temperature change, or does so only slightly.

A further advantage of the steel absorber mass attached to the conductor plate is that the efficiency of the eddy current through the steel behind the conductor plate is additionally increased.

According to the invention, the magnet element is formed by a device rotating during operation, preferably a rotationally symmetric disk. In this case, permanent magnets, directly arranged accordingly, can be used, or can be mounted on a carrier disk, distributed on the same.

The magnet element and/or the magnet disk, is positioned with a substantially uniform distance from the conductor element. As already mentioned, the distance or gap to the conductor element of high surface area determines the efficiency of the eddy current damping. At a greater distance, the damping power decreases; it increases at a smaller distance. As such, when the efficiency decreases relatively, as described, due to an increase in temperature during operation, this undesired effect can be compensated by reducing the distance between the magnet element and the conductor element. Conversely, when the efficiency of the damper increases relatively due to a temperature drop during operation, the effect can be compensated by increasing the distance between the two elements. According to the invention, this is carried out in a self-regulating manner by the displacement and expansion elements described below, such that a certain distance can always be maintained between the two elements, and thus a certain damping value can always be maintained, irrespective of the change in temperature.

The rotating magnet disk is therefore displaced according to the invention in a temperature-dependent manner, while maintaining a largely constant predetermined damping value; at the same time, the temperature generated by the eddy current is substantially generated on the stationary conductor element and is dissipated to the absorber mass.

The temperature-dependent displacement of the disk-shaped magnet element takes place as follows: The magnet disk is attached at one end of a shaft which is driven by a wheel at the opposite end of the shaft, and thus makes the magnet disk rotate. The magnet disk is simultaneously arranged opposite the conductor element, which is connected to the movable absorber mass. The magnet disk and conductor element are separated from one another by a substantially constant gap. The magnet disk is also attached to a displacement element, which is arranged, for example, around the shaft toward the inside, and can be pushed back and forth along the shaft axis within a limited range. The magnet disk is thus also displaced axially, and the distance from the stationary conductor element is changed as a result. The displacement element is expediently arranged rotationally symmetrically around the shaft and is operatively connected to the magnetic disk. The displacement element is pressed outwards by a preload force acting in the direction of the magnet disk, for example in the form of a spring or hydraulic device, which is positioned further inward on the shaft according to one embodiment of the invention, such that there is a defined distance of the magnet disk from the conductor element. By an inward displacement against the preload force, the gap distance of the magnet disk from the conductor element is reduced, and the damping effect is thereby increased. The axial movement of the displacement element along the shaft can take place, for example, by means of a plain bearing. In this case, the displacement of the displacement element can be transmitted, for example, via a roller bearing and an actuating slide element to the magnetic disk. The displacement of the displacement element inwards against the preload force of the spring element then takes place as a temperature-dependent, variable expansion/displacement volume, which also defines the distance between the magnet disk and the conductor element. This means that, when the temperature increases, the material of this expansion volume expands more than the material of the displacement element in connection with it. The displacement element is pressed inward against the preload force of the spring element by the force which is generated by the expansion, with a corresponding axial displacement out of the starting position, as a result of which the magnet disk is also pulled inward, reducing the gap distance between the magnet disk and the conductor element. In the warm/hot state, the distance is thus reduced and the damping is thus increased, while in the event of a decrease in temperature, contraction of the expansion volume takes place, as a result of which a return of the magnet disk into the initial state can take place as a result of the permanently outwardly directed preload force. As such, a larger gap distance is again established, and the damping is reduced compared to the higher-temperature state, assuming the original values. At still-lower temperatures than in the initial state, the expansion volume contracts further, such that the distance between the magnet disk and the conductor disk is greater than in the original state. The damping therefore does not increase further at colder temperatures than in the original state.

The expansion volume can, for example, be arranged in a rotationally symmetric manner around the shaft in a manner corresponding to that of the displacement element. However, it can also be placed elsewhere on the absorber, provided that it has sufficient contact with the absorber mass in order to absorb the heat that it dissipates, which has arisen in the eddy current operation. So that the effect is adequate and effective, the expansion volume should have as short a path as possible to the region of the heat generation of the eddy current elements, should be sufficiently large, and should have an expansion coefficient which can be a multiple (at least 5-10 times) of the surrounding material, in particular of the displacement element. Corresponding materials, such as plastics or polymer materials, are sufficiently known in the prior art. Many plastics, such as polypropylene, polyethylene or silicone, have a sufficiently high (approximately 10-20 times) thermal expansion coefficient compared to steel—which the displacement element is usually manufactured from.

The proposed design of the oscillation damper furthermore requires that the torque of the shaft can be transmitted to the magnet disk attached to the displacement element. For this purpose, a coupling device is provided between the shaft and the magnet disk. The coupling device can, for example, comprise a rigid torque lever with slats which elastically bend upon displacement of the magnet disk out of the starting position, and/or—if rigid elements or torque levers are used for this purpose, can comprise slide bushings or other sliding elements.

In one embodiment of the invention, an idle device is additionally provided for the magnet disk. This is intended to prevent the magnetic disk from rotating together with the shaft and the rollers or wheels upon small movements or amplitudes of the absorber mass, in order to enable no damping generated by eddy current.

Such an idle device can comprise, for example, a torque lever with defined free rotational angles and elastic stop elements. This torque lever can thus move together with the rotating shaft within the free rotational angle during the pendulum movements of the absorber mass on the curved running rail, without fully entraining the magnet disk each time. Only when the stop points are reached is the magnet disk driven, generating the oscillation-damping eddy current in cooperation with the conductor element.

BRIEF DESCRIPTION OF THE DRAWINGS

The invention is described in more detail below with reference to the drawings.

DETAILED DESCRIPTION OF THE DRAWINGS

Figure 1A:
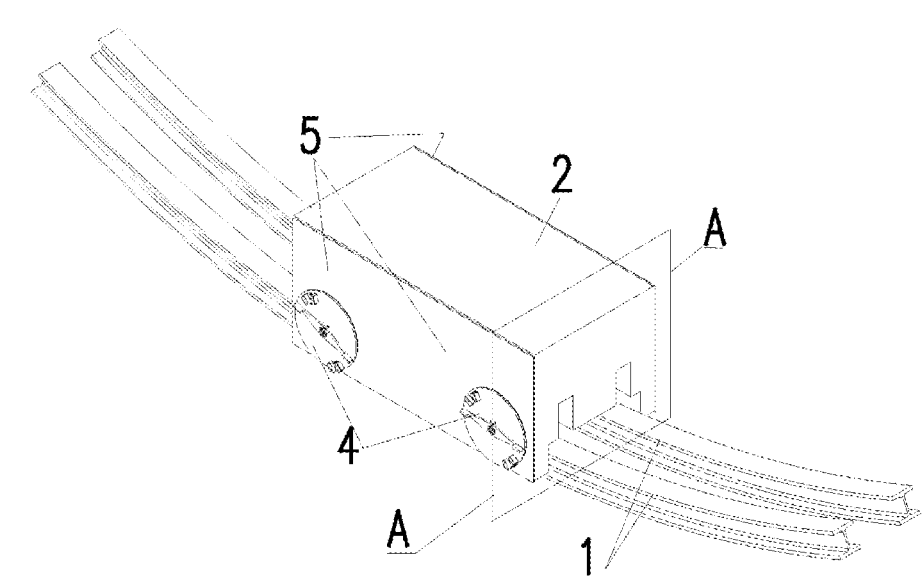
FIGS. 1(A) and 1(B) show perspective views of an oscillation damper according to the invention.
Figure 1B:
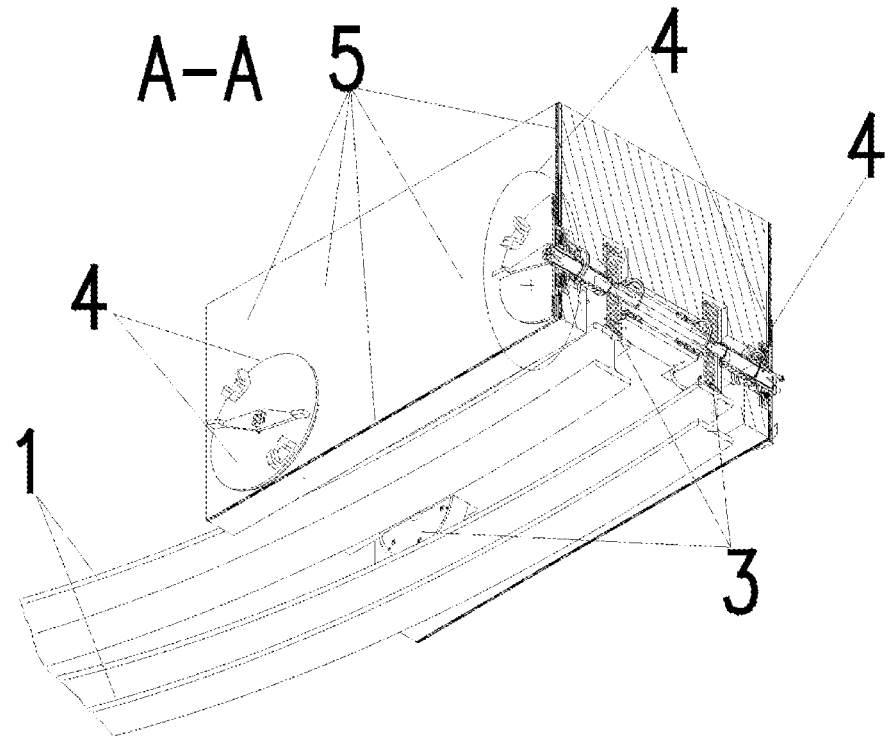

FIG. 1(A)(B) shows two perspective views of an oscillation damper according to the invention on a running rail device (1). The oscillation damper itself comprises the oscillating mass (2), which is moved on four wheels (3) on the rails. The rails are curved in a circular arc so that the absorber mass used as a carriage can roll back and forth in the direction of the rails (1), corresponding to the oscillation forces acting on the system. The four rollers (3) are mounted on shafts which are guided through openings in the projecting mass, and which each have their own rotationally symmetric damping element (4) on the outside thereof. A rotation damper element (4) comprises a rotationally symmetric carrier disk (13) and permanent magnets (14). The rotation damper elements (4) rotate together with the rollers/wheels (3) via their shared shaft. The oscillation mass (2) is covered on its surface with one or more conductor plates (aluminum). In the region of the rotation elements (4), the conductor plate is arranged parallel between the mass (2) and the rotation element (4) and has a gap distance which is substantially constant with respect to the surfaces in question.

Figure 2:
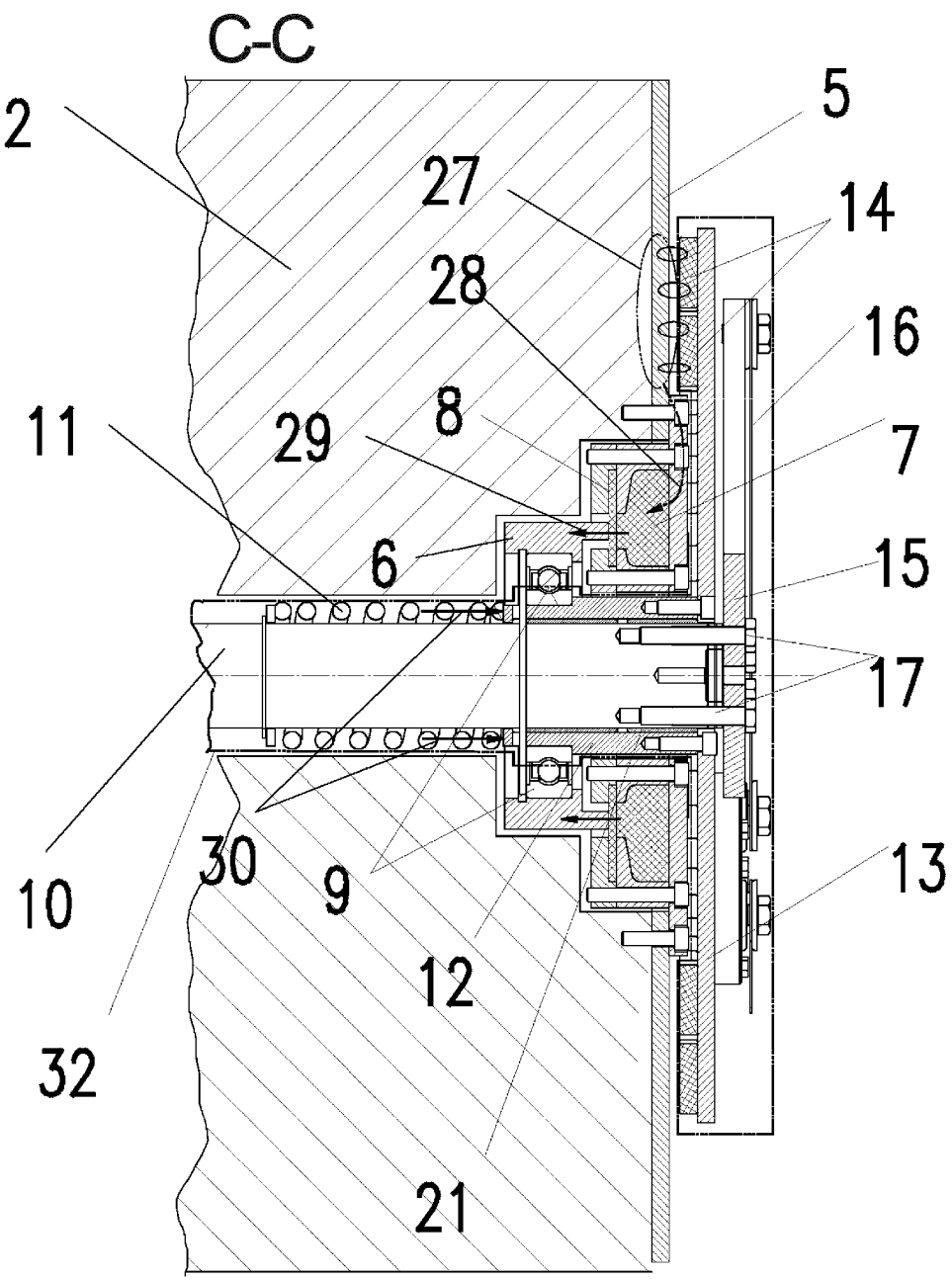
FIG. 2 shows a sectional view of a rotation element arranged in the oscillation damper according to the invention.

FIG. 2 shows a section of the rotation element (4), its arrangement in the oscillation damper according to the invention, and details of its structural design.

A shaft (10) leads through a part of the absorber mass (2). The left (inner) end of the shaft is equipped with a roller (3) (not shown), which is moved on a running rail (1) (not shown). A part of the large-surface-area conductor plate (5) is attached to the right, outer surface of the absorber mass. The design of the magnet disk (13) (14), displacement element (6), and expansion volume (7) is shown at the right (outer) end of the shaft. A carrier disk (13) is equipped with a plurality of permanent magnets (14). The carrier disk is connected to the displacement element (6) and can be displaced axially by it. The displacement element (6) and thus the magnet disk (13)(14) are pressed axially outwards by a preload force (30) in the form of a spring (11), up to a stop point defined by the expansion volume (7). This produces a gap distance (33) between the magnets and the conductor plate (5) arranged in parallel, which can be reduced by a displacement inwards against the spring force (30) of the spring (11). The expansion volume (7) is arranged around the shaft in a correspondingly shaped recess of the absorber mass (2). This consists substantially of a temperature-dependent polymer which, in the event of a temperature increase, undergoes a significant increase in volume and thus exerts an axial, inwardly-directed force on the displacement element, and counteracts the spring force (30) of the spring (11). If this force due to the increase in volume of the polymer is high enough, the spring (11) is compressed and the displacement element (6) is pushed inward in the region (29). As a result, the magnet disk (13)(14), which is connected to the displacement element, is likewise pushed inward in the direction of the conductor plate (5), reducing the gap distance (33). The temperature increase necessary for the increase in volume takes place in the region (27) between the magnets (14) and the conductor plate (5) during rotation of the magnet disk. The heat generated in the region (27) is dissipated over a short distance (28) into the polymer chamber via the thermally conductive metal elements of the construction. Upon cooling, the expansion volume contracts again, and a movement of the component in question in the opposite direction takes place due to the now-dominant spring force (30) of the spring (11). In order for the polymer to not be pressed in an uncontrolled manner into the displacement element (6) upon an increase in the volume, a barrier membrane (8) can be provided for cases in which the polymer volume is liquid or semi-liquid. If a solid is used, the barrier membrane can be omitted. In the embodiment shown, the displacement element (6) itself consists of an actuating slide (12), a sliding plain bearing (21) and a rotational roller bearing (9). Due to the required displaceability of the magnet disk (13)(14), it cannot be connected directly and fixedly to the shaft (10). In order nevertheless to transmit the torque of the shaft (10) to the magnet disk (13)(14), a coupling element is provided which, in the embodiment shown, comprises a torque lever (15), a plurality of coupling disks (16) and a shaft fastening (17). The torque lever (15) is fixedly connected to the shaft (10) via the connecting elements (17), and the elastic lamellae (16) are connected to the outer side of the carrier disk (13). When the magnet disk is displaced inward and/or in the direction of the conductor plate (5) (in the event of a temperature increase), the lamellae are reversibly bent.

Figure 3:
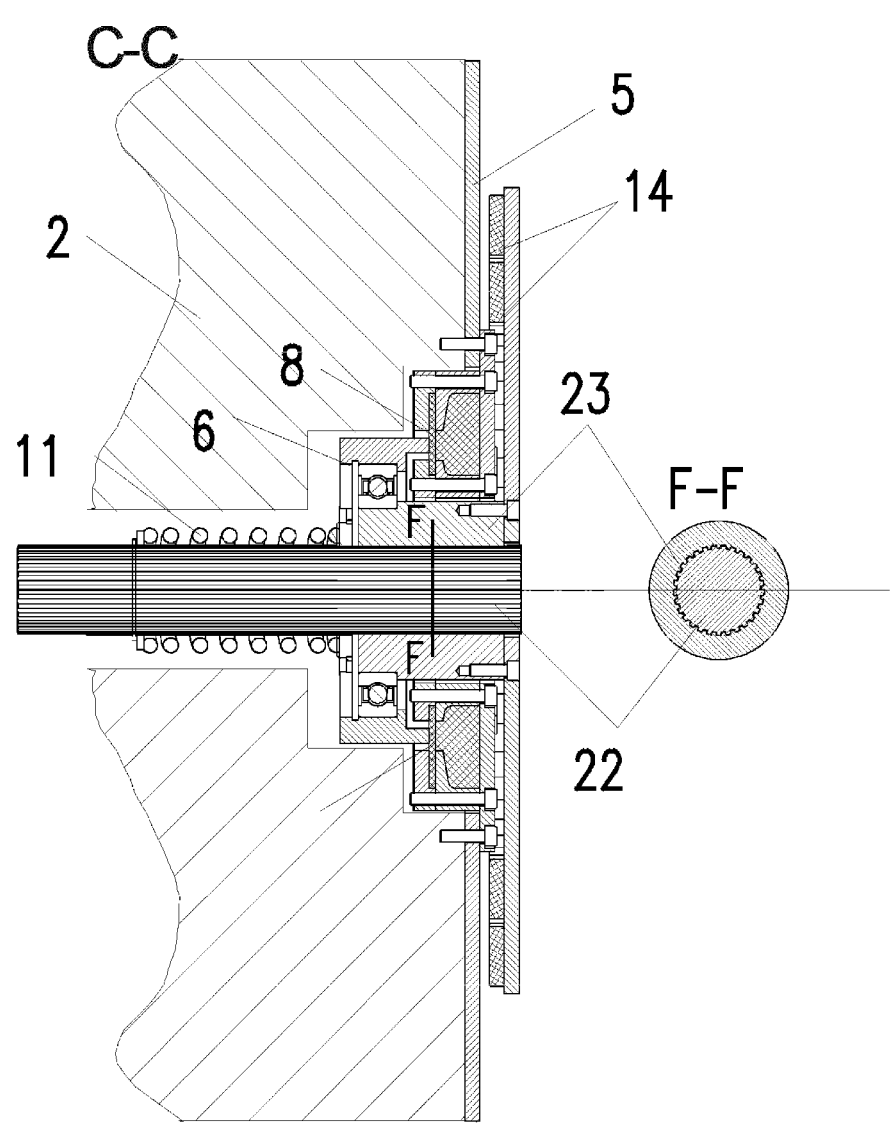
FIG. 3 shows a sectional view of the rotation element arranged in the oscillation damper without a coupling device.

FIG. 3 largely corresponds to the illustration of FIG. 2, with the exception of the coupling element (15)(16)(17), which in this case is a splined shaft coupling. In this embodiment, the torque transmission is effected by a splined shaft (22) in conjunction with a ribbed sleeve (23).

Figure 4:
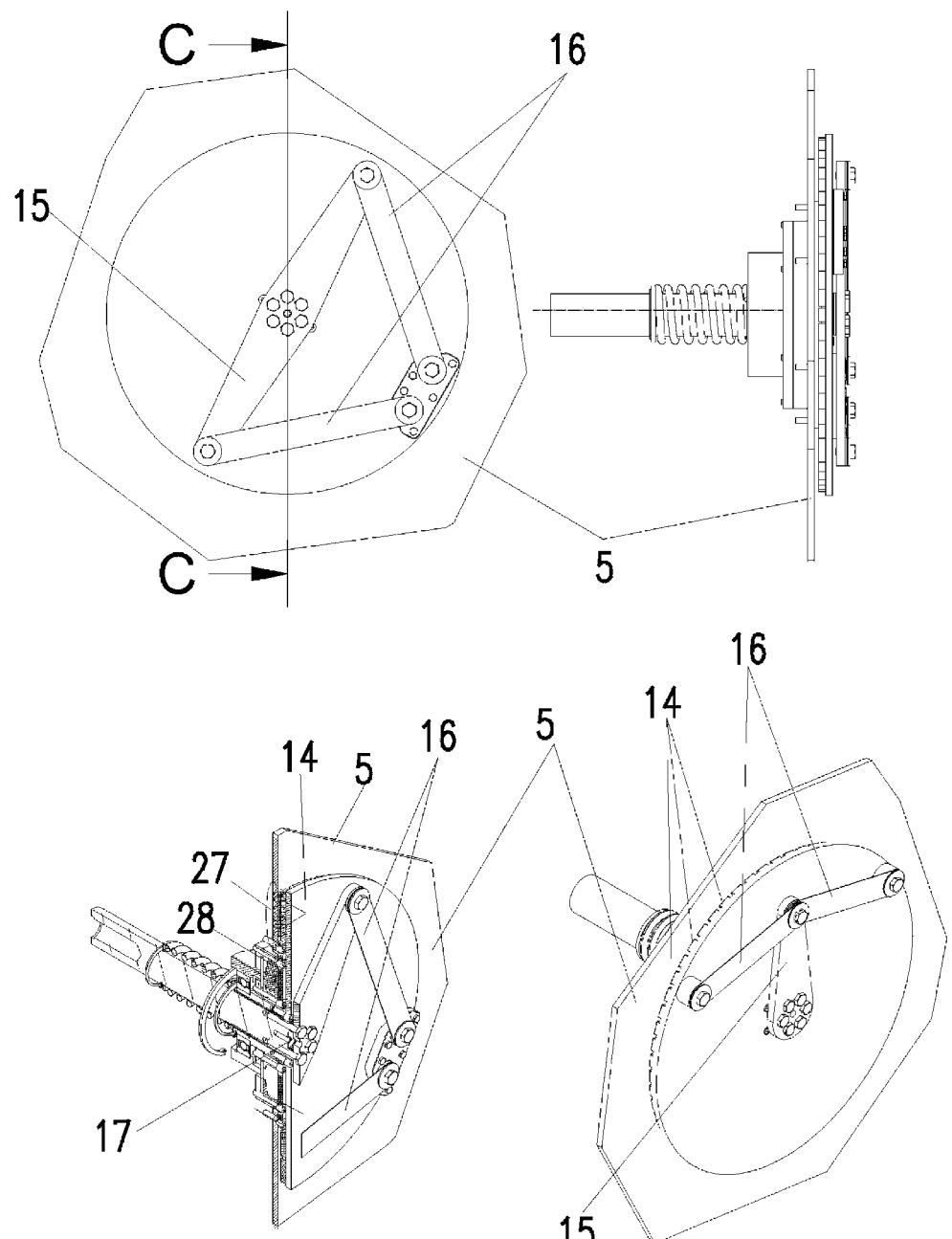
FIG. 4 shows detailed views of a lamella coupling device for transmitting torque.

FIG. 4 likewise relates to FIG. 2 and shows in detail, in different views, the lamella coupling device for transmitting the torque.

Figure 5A:
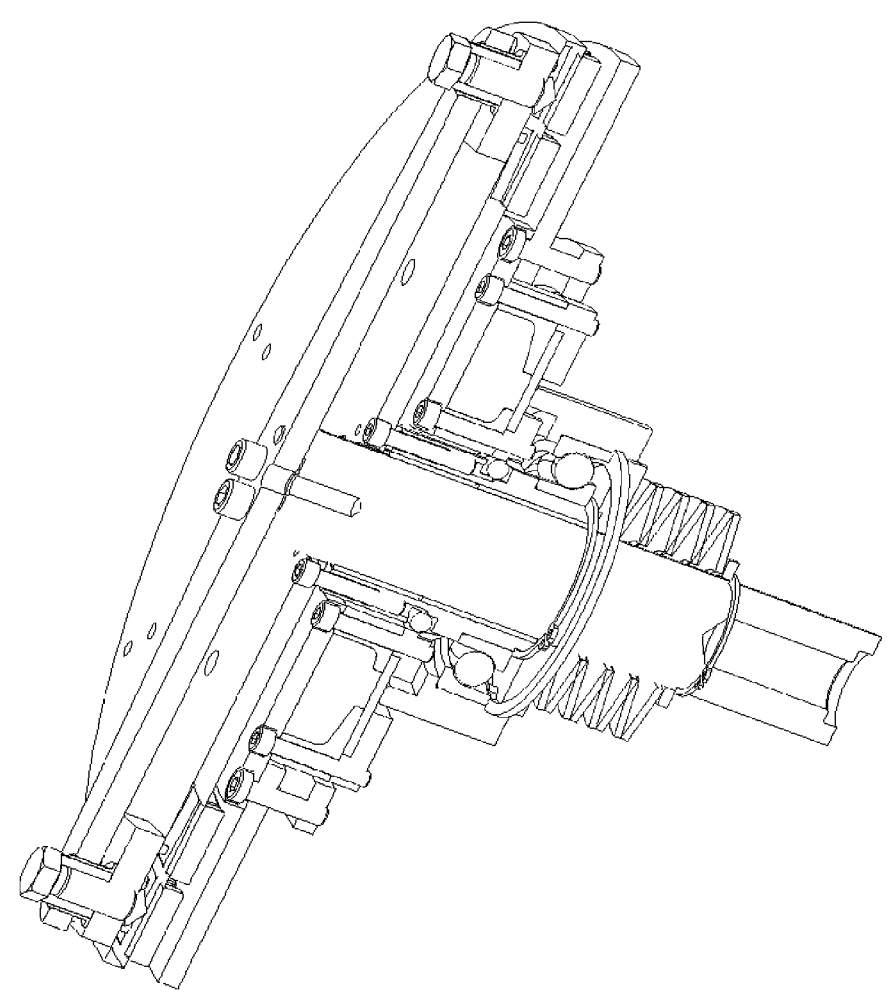
FIG. 5(A) shows a 3D view of the oscillation damper according to the invention.
Figure 5B:
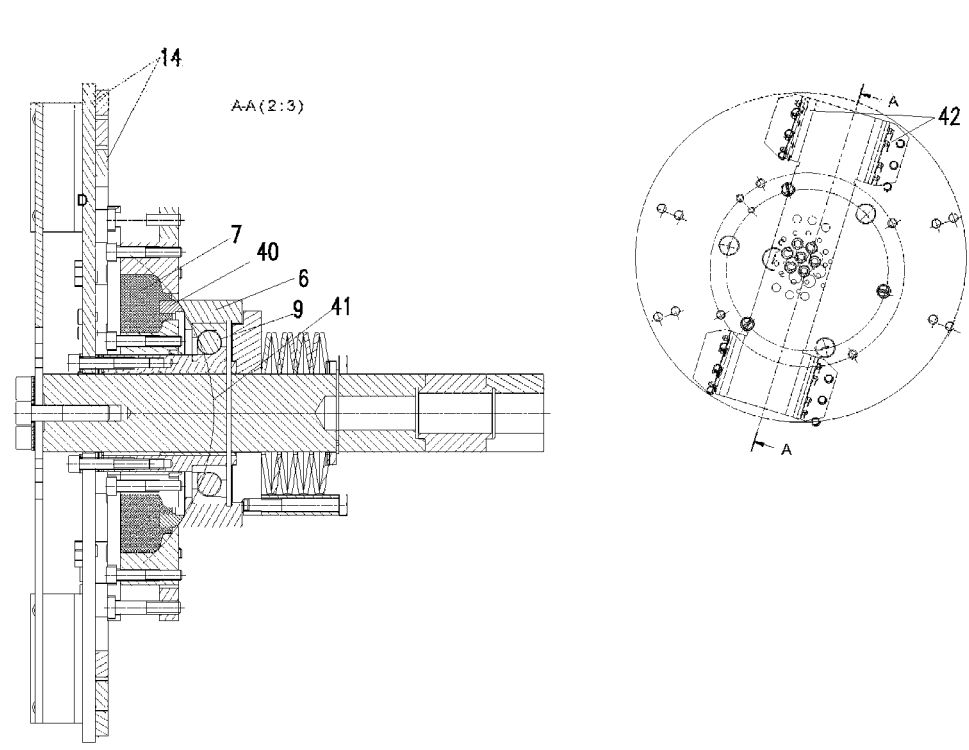
FIG. 5(B) shows various views of the oscillation damper according to the invention.
Figure 5B:
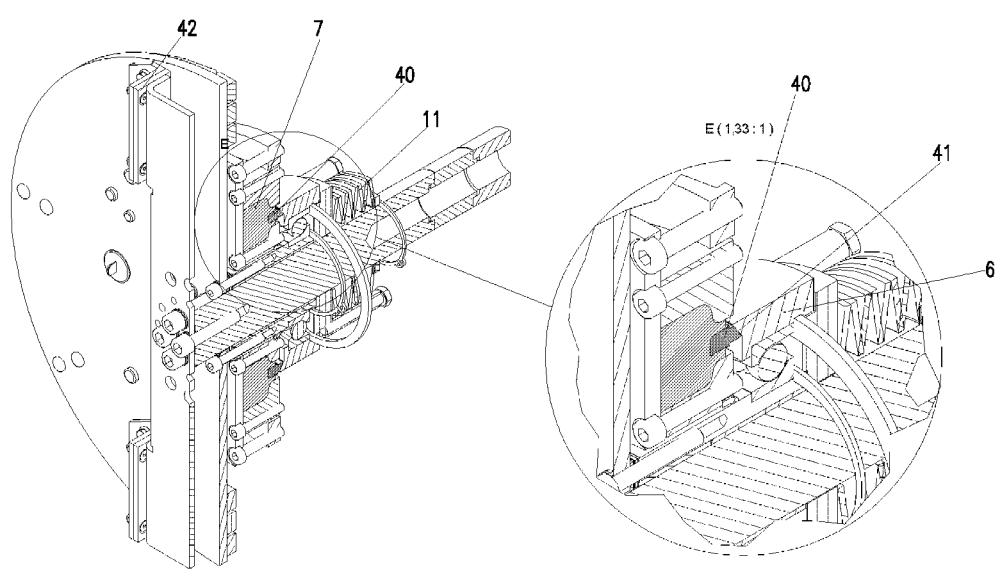

FIG. 5 (A) shows a 3D view of the oscillation damper according to the invention (without the absorber mass and rollers), in which the torque transmission takes place via a torque lever, but without elastically bendable lamellae. Instead, a rigid torque lever is used, which is connected to the magnet disk via an axially-oriented sliding bushing mount, which makes it possible to displace the magnet disk along the shaft accordingly.

FIG. 5 (B) shows an analogous 3D view of the oscillation damper according to the invention, in which the rigid torque lever (15) is connected to the magnet disk via a sliding element (42) which yields in the axial direction and which can be displaced in the movement direction, or via an elastomer element which yields in this direction, such that the magnet disk is reversibly displaceable along the shaft. In the version shown, the expansion element (7) is designed as a solid body with a high expansion coefficient. This eliminates the membrane (8) required when liquids are used. A metallic element (40) for transmitting the pushing force is integrated into the expansion element (7) and exerts the compensation displacement against the spring force (30) via the displacement element (6) and the roller bearing (9). In order to compensate for angular errors, the connecting line between (40) and the displacement element (6) is spherical. A cardanic compensation is thus possible in the case of angular errors between the displacement element (6) and the pressure element (40).

Figure 6:
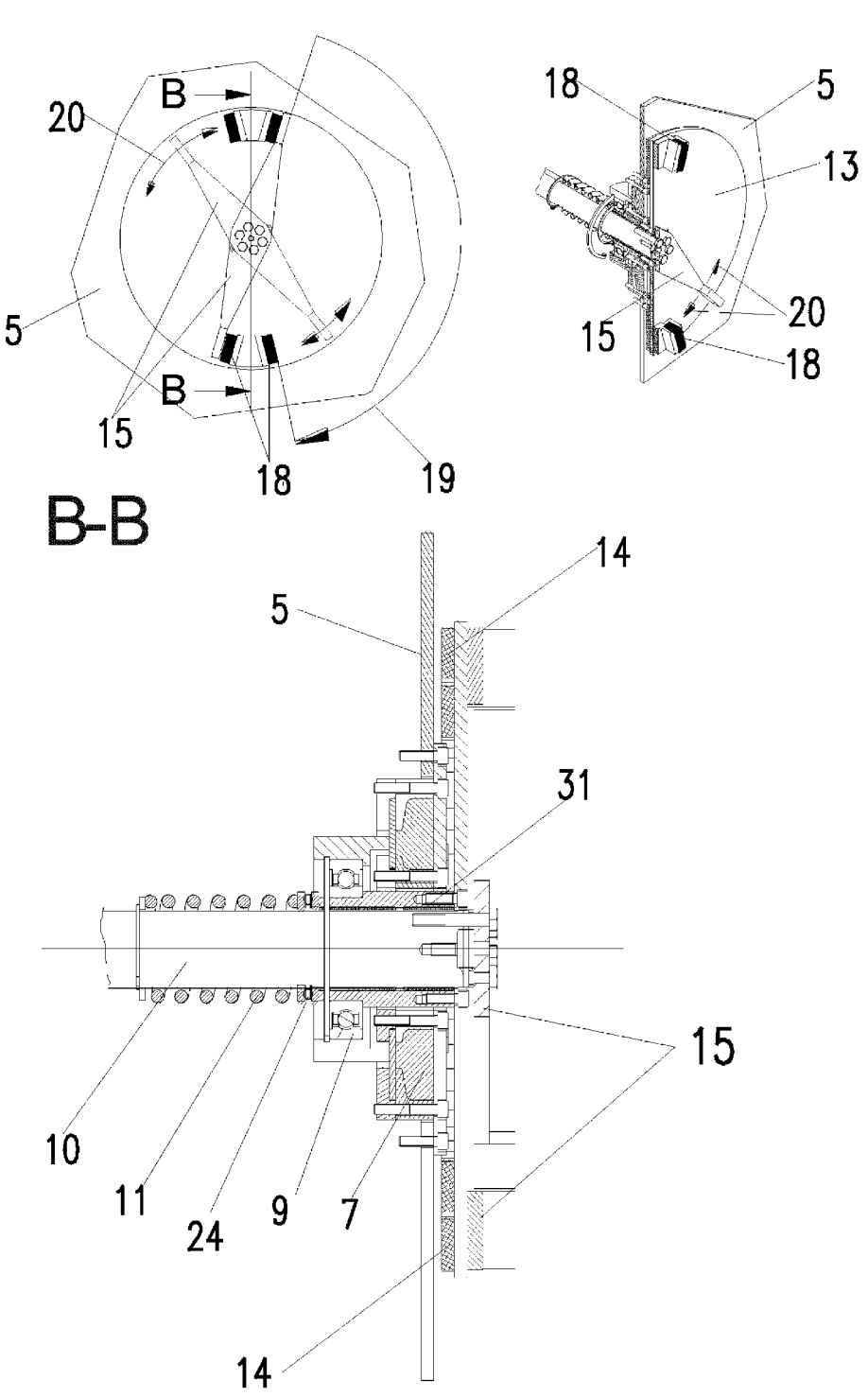
FIG. 6 shows various views of an embodiment of the oscillation damper according to the invention.

FIG. 6 shows different views of the oscillation damper according to the invention in an embodiment as described above, which, however, additionally has an idle device (18)(19)(20) for the magnet disk (13) (14). The idle device is formed by at least one, preferably two stop points (18). In the illustration, two opposite stop points are provided, which cushion the stop by elastic compression. The lever (15) thus has a free rotational angle (19) and can thus perform a free rotating movement (20) during its pendulum movements during operation. If there are two stop points, the free angle of rotation is preferably about 150-160°. However, a single stop point can also be provided, such that the torque lever can move freely through 360°.

Figure 7:
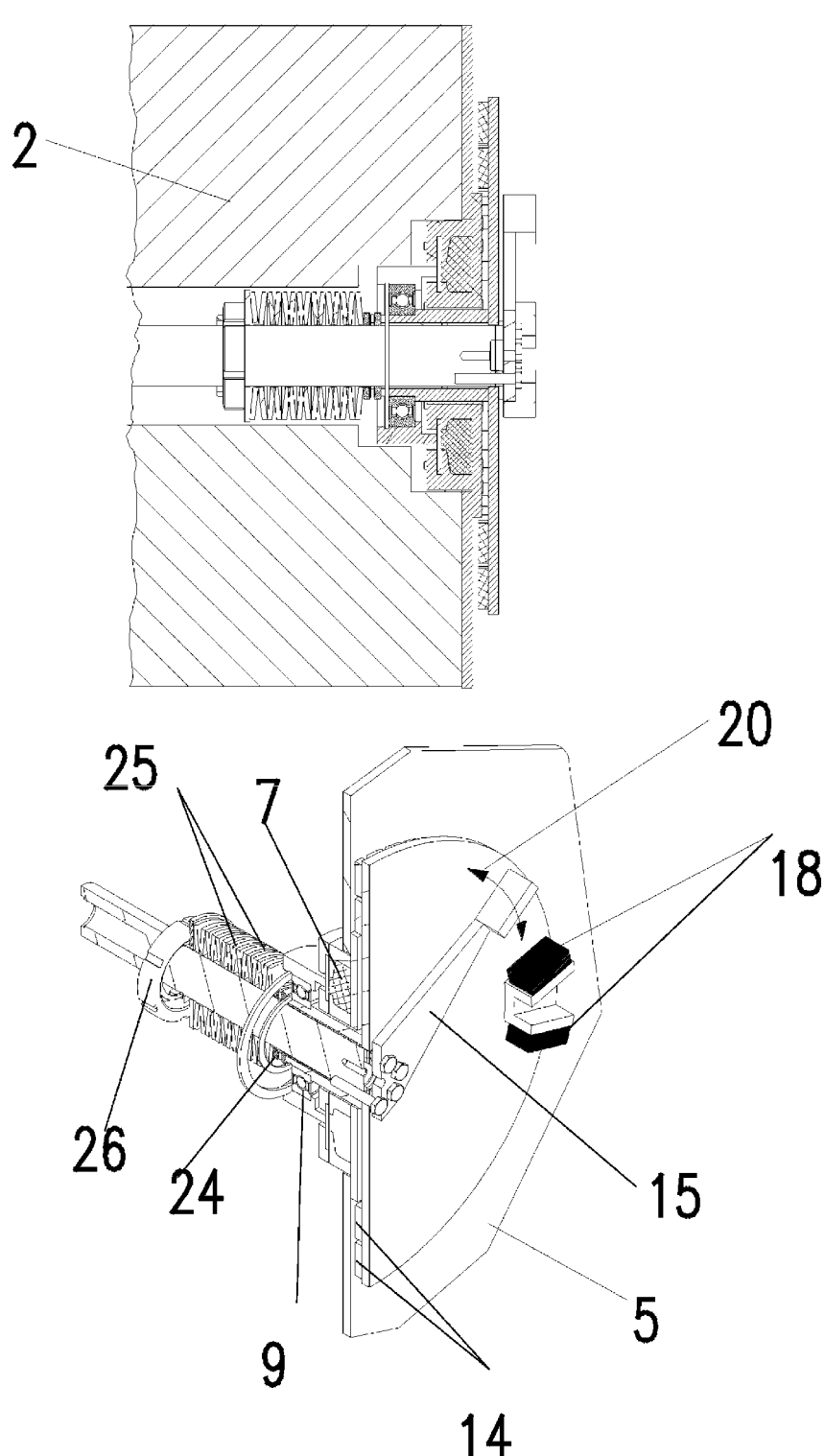
FIG. 7 shows views of the embodiment of the oscillation damper illustrated in FIG. 6 with an additional stop device.

FIG. 7 shows the same embodiment of the oscillation damper according to the invention in FIG. 6, —that is to say, with an additional stop device (18)(19)(20). The preload spring (11) has been replaced here by a disk spring stack (25) the clamping force of which can be regulated by means of an adjustment screw (26).

The invention claimed is:

1. A temperature-adaptive eddy current rotation oscillation damper, comprising:

(i) an absorber mass which is equipped with wheels or rollers mounted on at least one shaft, and which is movable on a guide device according to active oscillation forces, (ii) at least one rotationally symmetric magnetic disk, which is connected to the at least one shaft and rotates therewith when the absorber mass moves, and (iii) at least one stationary electrical conductor element, which is functionally connected to the at least one rotating magnetic disk via a gap, consequently generating an oscillation-damping eddy current during operation, wherein (iv) the electrical conductor element (5) is connected to the absorber mass (2), and a surface area and size of the electrical conductor element are selected in such a manner that the absorber mass (2) connected thereto functions as a cooling body to dissipate heat generated by the eddy current, (v) a displacement element (6) is provided which is able to axially move and displace the at least one magnetic disk (13)(14) on the at least one shaft (10) in such a manner that it changes a width of the gap (33) between the conductor element (5) and the magnetic disk (13)(14), and (vi) a temperature-dependent expansion volume (7) is provided, which acts on the displacement element (6) by having an expansion coefficient which is greater than an expansion coefficient of the displacement element, such that the displacement element (6), (a) upon expansion of the volume (7) by an increase in temperature, pulls the magnetic disk (13)(14) out of a starting position axially in a direction of the conductor plate (5), opposing a preload force (30) and reducing the gap (33), and (b) upon a contraction of the volume (7) when the temperature drops, pushes the magnetic disk (13) (14) by the preload force (30) back in a direction of the starting position, enlarging the gap (33).

2. The temperature-adaptive eddy current oscillation damper according to claim 1, wherein the displacement element (6) is in contact with the expansion volume (7), and both of the displacement element and the expansion volume are arranged rotationally symmetrically around the shaft (10) opposite the magnetic disk (13)(14) at an end thereof.

3. The temperature-adaptive eddy current oscillation damper according to claim 1, wherein the displacement element (6) is pressed by the preload force (30) in a direction of the expansion volume (7) and the magnetic disk (13)(14).

4. The temperature-adaptive eddy current oscillation damper according to claim 1, wherein the movement of the displacement element (6) is effected via a plain bearing (21) on the shaft (10).

5. The temperature-adaptive eddy current oscillation damper according to claim 1, wherein the displacement of the displacement element (6) is transmitted via a rolling bearing (9) and an actuating slide element (12) to the magnetic disk (13)(14).

6. The temperature-adaptive eddy current oscillation damper according to claim 1, wherein the torque required for the function is transmitted from the shaft (10) to the magnetic disk (13)(14) by means of a coupling device (15)(16) (17)(22)(23).

7. The temperature-adaptive eddy current oscillation damper according to claim 6, wherein the coupling device comprises a torque lever (15) with elastic lamellae (16) or a rigid torque lever (15) which is guided by sliding bushings or sliding elements (42).

8. The temperature-adaptive eddy current oscillation damper according to claim 1, wherein the electrical conductor element (5) is larger than the magnetic disk (13)(14).

9. The temperature-adaptive eddy current oscillation damper according to claim 8, wherein the electrical conductor element (5) is mounted over a large area on a surface of the absorber mass.

10. The temperature-adaptive eddy current oscillation damper according to claim 1, further comprising an additional cooling device for further discharging the heat generated by eddy current.

11. The temperature-adaptive eddy current oscillation damper according to claim 1, further comprising an idle device (18)(19)(20) which prevents the magnetic disk (13) (14) from rotating together with the shaft and the rollers or wheels upon small movements or amplitudes of the absorber mass (2), thereby achieving lower damping as desired under these conditions.

12. The temperature-adaptive eddy current oscillation damper according to claim 1, wherein the magnetic disk is formed from a carrier disk (13) and permanent magnets (14) attached thereto.

13. The temperature-adaptive eddy current oscillation damper according to claim 1, wherein the preload force (30) is provided by a spring device (11) or a hydraulic device.

14. The temperature-adaptive eddy current oscillation damper according to claim 13, wherein the spring device (11) is a disk spring stack (25).

15. The temperature-adaptive eddy current oscillation damper according to claim 1, wherein the guide device for the absorber mass (2) has at least one curved running rail or raceway for the rollers or wheels on which the absorber mass is movable back and forth like a pendulum in the event of oscillations.

16. A wind turbine comprising a mast, rotor, nacelle, and generator, and the wind turbine comprises an oscillation damper according to claim 1.

* * * * *